United States Patent Office 3,574,786
Patented Apr. 13, 1971

3,574,786
POLYACETAL COMPOSITIONS STABILIZED WITH A POLYMER FROM A DICARBOXYLIC ACID DIHYDRAZIDE, DIAMINE AND UREA
Shinichi Ishida, Tokyo, Noboru Ohshima, Saitama-ken, and Hiromichi Fukuda and Takeshi Sato, Tokyo, Japan, assignors to Asahi Kasei Kogyo Kabushiki Kaisha, Asaka, Japan
Filed Dec. 20, 1968, Ser. No. 785,599
Claims priority, application Japan, Dec. 25, 1967, 42/82,876
Int. Cl. C08g 41/04
U.S. Cl. 260—857          4 Claims

ABSTRACT OF THE DISCLOSURE

Polyoxymethylene compositions may be stabilized by the addition of 0.1 to 10% of a polymeric condensate prepared by reacting a dicarboxylic acid dihydrazide, a diamine, and a urea, thiourea or derivatives thereof. The proportions of the reactants are 1:0.1–5:0.1–10 respectively. The condensate is prepared by heating the reactants at 50° C.–300° C. from 1 to 20 hours in air or inert gas.

Figure 1:
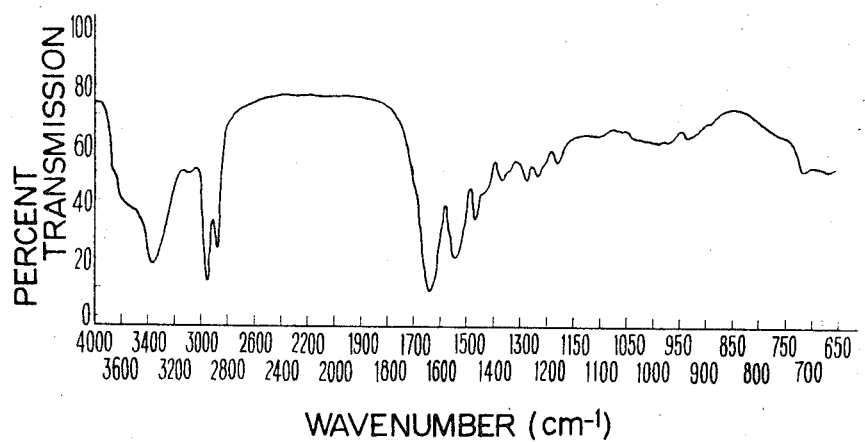

A polyacetal composition containing as a thermal stabilizer a nitrogen-containing ternary condensation polymer comprising (A) dicarboxylic acid dihydrazide, (B) diamine or polyamine and (C) urea, urea derivatives, thiourea or thiourea derivatives.

BACKGROUND OF THE INVENTION (1) Field of the invention

This invention relates to a polyacetal composition containing as a thermal stabilizer a nitrogen-containing ternary condensation polymer comprising (A) dicarboxylic acid dihydrazide, (B) diamine or polyamine and (C) urea, urea derivatives, thiourea or thiourea derivatives.

(2) Description of the prior art

In recent years, polyacetal resins have been obtained, by polymerizing formaldehyde or a cyclic oligomer thereof, e.g. trioxane or tetraoxane, or by copolymerizing the same and monomers copolymerizable therewith and treating the terminal groups of the resulting polymer or copolymer in various ways, e.g. etherification or esterification, for preventing depolymerization from the terminal groups thereof. By compounding the resulting polyacetal with antioxidants, light-stabilizers and lubricants, there is obtained a composition for moulded articles.

In the production of polyacetal resins, incorporation of a thermal stabilizer in addition to the treatment of terminal groups mentioned above is necessary and quite important for retaining or enhancing qualities of the product resins. Hence, many and various attempts and proposals have been made heretofore in this regard.

For example, there has been proposed to use as a thermal stabilizer many and various substances such as urea or derivatives thereof, hydrazine or derivatives thereof, amides, polyamides and sulfur compounds, either alone or in combination with antioxidants, light-stabilizers and the like.

However, although these thermal stabilizers proposed heretofore are effective to some extent, their stabilizing effects are generally unsatisfactory. For example, some low molecular weight thermal stabilizers evaporate and escape during the shaping process of polyacetal, or, cause bleeding after the moulding thereof, leading to drastic degradation in the stabilizing effect, so that they are impracticable on account of their incapability of maintaining the stabilizing effect.

Although it is described that, among known thermal stabilizers, polyurea or polythiourea is relatively effective as a thermal stabilizer for polyoxymethylene, its capability is insufficient to meet the requirement called for in the actual shaping processes.

A certain specific polyamide has relatively sure and endurable thermal stabilizing effect so that it is a type of thermal stabilizer which may be used practically. However, not all polyamides are effective and only copolyamides derived from two or more dicarboxylic acids or diamines are capable of manifesting thermal stabilizing effect to the extent of a practically utility.

It is presumed that this is attributable to the melting point (softening point) or crystallinity thereof. To wit, preferable are copolyamides having melting points in the vicinity of our lower than the melting point of polyoxymethylene, i.e. 176° C., or fabrication temperature thereof, i.e. 230° C., for example, a terpolymer comprising 35% of hexamethyleneadipamide, 27% of hexamethylenesebacamide and 38% of caprolactam shows a good thermal stabilizing effect.

However, the copolyamides mentioned above which show an excellent performance still have serious drawbacks, one of which being coloration when subjected to a combined action of heat, light and/or oxygen. That is, polyacetal into which these copolyamides are incorporated tends to be colored when processed or stored for a prolonged period of time and qualities of the products are drastically deteriorated.

In general, in the processing of synthetic resins, a reclaim shaping in which runner portion in an injection moulding, defected or broken products are reclaimed and shaped again, is commonly practised for enchancing the shaping efficiceny. In this instance, it is of course highly desirable that qualities of the resulting products remain unchanged. However, in polyamide-incorporated polyacetal, the degree of coloration or discoloration is quite remarkable not only in the shaping process but also in the shaped products as the lapse of time.

Thus, even though polyamide thermal stabilizers have satisfactory thermal stabilizing effect, they have a serious drawback with regard to the coloration and discoloration as compared with a polyacetal composition into which no polyamide is incorporated.

SUMMARY OF THE INVENTION

It is, therefore, an object of this invention to provide a novel thermal stabilizer having an excellent stabilizing effect and free from these drawbacks accompanied by thermal stabilizers of the prior arts known heretofore, and a process for producing such a novel thermal stabilizer.

It is another object of this invention to provide a polyacetal composition containing such a novel thermal stabilizer.

The novel thermal stabilizer of the present invention is a novel nitrogen-containing ternary condensation polymer, belonging to none of polyamides, polyamino triazol nor polyurea, which is obtained by condensing at a temperature of from 50° C. to 300° C. (A) at least a member selected from the group consisting of aliphatic, alicyclic and aromatic dicarboxylic acid hydrazides, (B) at least a member selected from the group consisting of diamine and polyamine, and (C) at least a member selected from the group consisting of urea, urea derivatives, thiourea and thiourea derivatives.

Dicarboxylic acid dihydrazides which may be used in the present invention include dihydrazides derived from dicarboxylic acids having from 2 to 20 carbon atoms, e.g. dihydrazides of oxalic, malonic, succinic, adipic, pentamethylene dicarboxylic, hexamethylene dicarboxylic, cyclohexane dicarboxylic, sebacic, suberic, terephthalic, naphthalene dicarboxylic, oxadivaleric, cyclohexyl dicarboxylic, pimeric, decamethylene dicarboxylic, brassylic, octadecane-1,18-dicarboxylic, eicosane-1,20-dicarboxylic, dimeric acids or a mixture of two or more of these.

Diamines which may be used in the present invention are diamines and polyamines having from 2 to 20 carbon atoms and a main chain of carbon alone or carbon and oxygen, e.g. polyalkylenediamines such as ethylenediamine, propylenediamine, tetramethylenediamine, pentamethylenediamine, hexamethylenediamine, and 3,9-bis(3-aminopropyl)-2,4,8,10-tetroxaspiro[5.5]undecane, xylylenediamine, 1,4-di($\gamma$-aminopropyl) benzene, 4,4'-methylenebis(1-aminomethyl benzene), 4,4'-methylenebis(1-aminomethylcyclohexane, p - diaminocyclohexane, isophoronediamine; polyamines such as polyethyleneimine and tetraethyleneimine.

Ureas which may be used in this invention include urea, ethyleneurea, biurea, biuret, methylenebisurea, thiourea and ethylenethiourea.

Although no particular restriction is imposed on the combination of these dicarboxylic acid dihydrazides, amines and ureas, it is desirable that a selection be made so as to afford a reaction product having a suitable melting point (softening point) and excellent performance.

The ternary condensation polymer of this invention is obtained by mixing 0.1–5.0 mols of (B) diamine or polyamine and 0.1–10.0 mols, preferably 0.1–8.0 mols, of (C) urea, urea derivatives, thiourea or thiourea derivatives per mol of (A) dicarboxylic acid dihydrazide, melting and mixing the resulting mixture and heating the same at a temperature of from 50° C. to 300° C. under atmospheric pressure or nitrogen stream. When the reaction product thus obtained is further heated at a temperature of from 150° C. to 300° C. under a reduced pressure to distill off unreacted and volatile matters therefrom, there is obtained a reaction product which may not be colored even if heated for a prolonged period of time.

The reaction time is normally 1–20 hours, preferably with a preliminary reaction time of 1–10 hours and the reaction time under a reduced pressure is desirably 1–10 hours.

The dicarboxylic acid dihydrazides used in the present invention are synthesized by the reaction of dicarboxylic acids or derivatives thereof, e.g. esters, with hydrazine, hydrazine hydrate or hydrazine salts.

In the present invention, the dicarboxylic acid dihydrazides may be replaced by dicarboxylic acids or derivatives thereof and hydrazine or derivatives thereof, which are the starting materials for the dicarboxylic acid dihydrazides.

More particularly, the nitrogen-containing condensation polymer of this invention may be obtained by condensing at least one acid component selected from the group consisting of dicarboxylic acid moonhydrazide, dicarboxylic acid, dicarboxylic monoester and dicarboxylic diester, at least one hydrazine component selected from the group consisting of hydrazine, hydrazine hydrate and hydrazine salt; diamine and urea.

When substituting dicarboxylic acids or derivatives thereof and hydrazines or derivatives thereof or dicarboxylic acid dihydrazines in the preesnt invention, dihydrazides may also be obtained by maintaining the reaction system at a temperature lower than 160° C. at an initial stage of the reaction. Then, the reaction is proceeded in the manner as described above thereafter to give the contemplated condensation product. Thus, this process naturally falls within the scope of the present invention.

The resulting nitrogen-containing condensation product generally is white in color, or colorless, and the melting point and solubility varies depending upon the types of dicarboxylic acid hydrazide, urea and diamine used and the composition thereof.

The condensation product has no definite melting point. However, the softening point varies in a wide range of from 40° C. to 260 C. depending upon the composition and composition ratio of the charged reactants, and the condensation product is an amorphous substance in a X-ray-wise sense.

Figure 2:
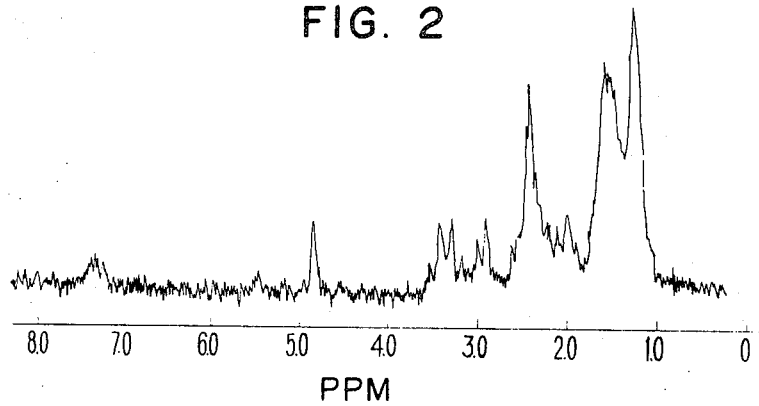

For clarifying the properties of the condensation product of this invention, FIG. 1 of the accompanying drawing shows an infrared absorption spectrum according to KBr tablet method, and FIG. 2 illustrates a nuclear magnetic resonance spectrum of a urea-hexamethylenediamine-adipic acid dihydrazide ternary condensation product.

These spectra differ from any of those polyurea obtained from urea and hexamethylenediamine; polyaminotriazol obtained from adipic acid dihydrazide; a condensation product synthesized from adipic acid dihydrazide and urea or hexamethylenediamine; or polyamide synthesized from hexamethyleneadipamide, and these substances as mentioned above could not be isolated from the instant condensation product. Thus, it is clear that the instant condensation product differs from any of these mentioned above.

Analysis of these spectra reveals that the instant reaction product is a novel nitrogen-containing condensation polymer of a complicated structure having such groups as —CONH—, —NH—, —NCH$_2$— and —COCH$_2$ on its main or side chains and showing peaks at 3300 cm.$^{-1}$ representing $\nu$NH$_2$ in CONH$_2$ and CONHNH$_2$, at 3200, 3040 cm.$^{-1}$ belonging to $\nu$NH in said groups; at 1710 cm.$^{-1}$ representing $\nu$C=O in CONHNHCO; at 1600 cm.$^{-1}$ representing $\delta$NH$_2$ in CONH$_2$; at 1530 cm.$^{-1}$ representing $\delta$NH in

CONHNHCO at 1645 cm.$^{-1}$ standing for the first $\nu$C=O of amide in NHCONH—R; at 1565 cm.$^{-1}$ representing the second $\delta$NH of amide and at 1470 cm.$^{-1}$ representing $\nu$CH in (CH$_2$)$_n$.

The ternary condensation polymer of this invention can be distinguished from those known condensation products as mentioned above with respect to the solubility, melting point and other physical properties, inter alia, the greatest difference being that the colorless and transparent or translucent condensation product of this invention is soluble in methanol while those known heretofore are not.

The properties of the condensation polymer of this invention may be modified by varying the constituent composition, or, inversely, the composition may be altered or selected depending upon the use thereof.

One of the most outstanding feature of the condensation product of this invention is that it enables the production of colorless and transparent resin shaped articles completely free from coloration or discoloration owing to the action of heat and/or oxygen, by suitably selecting the material, composition and reaction temperature, and no important change is observed in a heat-treatment at 220° C. for 60 minutes with a preferably embodied condensation product of this invention.

A great majority of the condensation products afforded by this invention have a wettability and strong affinity with the most dyestuffs such as acidic, disperse, acetate and polyester dyes. Thus, by taking advantage of these outstanding features, the condensation product of this invention may be used either alone, e.g. as a material for shaped articles, films, fibers, etc., or as an additive to be incorporated into other plastics and fibers for improving or modifying the properties thereof. In particular, the nitrogen-containing condensation product of this invention may be advantageously used by compounding with polyacetal resins for remarkably improving their thermal stabilities.

No particular restriction is imposed on the degree of polymerization of the condensation product used for this purpose and oligomers thereof may also be used.

The solution viscosities of the nitrogen-containing condensation products of this invention are determined by using Ostwald's viscometer in a methanol solution at 30° C.

The condensation product of this invention may be incorporated into polyacetal at any desired stage during the production of polyacetal resins, and the incorporation may be accomplished in any desired manner, e.g. in the forms of a powder, solution in solvents or emulsion.

In the present invention, the condensation product may be used together with antioxidants with preferable results.

Antioxidants which may be used in this invention include aromatic amines and phenols, and particularly the phenols, inter alia, bisphenols, e.g. alkyl-substituted phenols, cresol, alkyl-substituted hydroquinone and alkylidenebisalkyl-substituted phenols are effective. In addition, alkyl-substituted phenol formates are also effective.

The preferable nitrogen-containing condensation product of this invention has a colorless transparent appearance and since it is stable against heating, completely free from coloration and discoloration as described above, it may be used in combination with various antioxidants.

It is another feature of the present invention that by the combination use of the condensation product with a methylene bis-phenolic antioxidants, e.g. 2,2'-methylenebis(4-methyl-6-tert-butylphenol), which tend to cause coloration when used in combination with a polyamide thermal stabilizer, which is a terpolymer comprising about 38% of caprolactam, 35% of hexamethyleneadipamide, and 27% of hexamethylenesebacamide, afford a satisfactory stabilizing effect without coloration.

In addition, for obtaining a better polyacetal composition, it is desirable that light-stabilizers such as benzophenones and triazols be used in combination therewith.

In the polyacetal composition of this invention, 0.1–10% by weight of the nitrogen-containing condensation polymer, 0.01–5% by weight of antioxidants and 0.01–5% by weight of light stabilizers based on the weight of polyacetal may be incorporated.

As described above, this invention is applicable to polyacetals such as polyoxymethylene synthesized from formaldehyde or cyclic oligomers thereof such as trioxane and tetraoxane, or copolyacetals obtained by copolymerizing comonomers such as styrene, acrylamide, dioxolan or ethylene oxide, therewith, said polyacetals and copolyacetals being subject to a treatment in which terminal groups thereof are stabilized.

In particular, this invention is effective with regard to polyoxymethylenediacetate.

The present invention is capable of rendering a polyacetal composition a better thermal stability, providing a composition of commercial value and utility.

DESCRIPTION OF PREFERRED EMBODIMENTS

The following examples will illustrate this invention more fully and practically. It should not be construed, however, that these examples restrict this invention in any way since they are given for the sole purpose of illustration.

Examples 1–4

To a 300 cc. three-neck flask provided with an agitator were charged 42.5 parts by weight of adipic acid dihydrazide and heated at 200° C. under nitrogen stream to melt the same. To the flask were then charged 58.7 parts by weight of urea and 27.8 parts by weight of hexamethylenediamine and the reaction temperature was lowered to 170° C. in the course of 30 minutes and the reaction was further carried out by heating at 170° C. for 300 minutes. The reaction mixture increased its viscosity as generating ammonia gas and turned to a very viscous, colorless and translucent molten fluid.

The reaction system was connected to a vacuum line of 1 mm. Hg and the reaction was further carried on by heating at 200° C. for 300 minutes to yield 95 parts by weight of a condensate of colorless and translucent appearance and having elementary analysis values of 56.12% carbon, 8.66% hydrogen, and 20.34% nitrogen.

The resulting condensate was incorporated into a polyoxymethylene having an intrinsic viscosity of 2.10 as measured in an equivalent mixed solution of tetrachloroethane/p-chlorophenol at 60° C., which was obtained by polymerizing a substantially anhydrous formaldehyde using a catalyst and acetylating with acetic anhydride, to measure the thermal stability.

With the same polyoxymethylenediacetate were incorporated copolyamide, polyaminotriazol, urea and adipic acid dihydrazide, respectively, in the same manner for comparing the thermal stabilities. The results are tabulated in the following Table 1.

In all compositions was incorporated 0.2% by weight of 2,2'-methylenebis(4-methyl-6-tert-butylphenol).

TABLE 1

| Examples Nos. | Additives | Amount added, percent | R,[1] percent | S,[2] ml./g. | Whiteness of 3 mm. thickness shaped plate [3] (Z value) |
|---|---|---|---|---|---|
| 1 | Adipic acid dihydrazide, urea, hexamethlenediamine condensate. | 0.5 | 98.50 | 22 | 98 |
| 2 | do | 1.0 | 99.05 | 13 | 98 |
| 3 | do | 1.5 | 99.06 | 14 | 98 |
| 4 | do | 3.0 | 99.00 | 14 | 97 |
| Comparative 1 | Polyaminotriazol synthesized from sebacic acid dihydrazide. | 2.0 | 96.21 | 142 | 90 |
| Comparative 2 | Copolyamide of hexamethyleneadipamide, hexamethylenesebacamide and caprolactam. | 2.0 | 97.50 | 100 | 95 |
| Comparative 3 | Copolyamide of Comparative 2. Diphenylamine. | 2.0 0.1 | 98.04 | 80 | 95 |
| Comparative 4 | Urea | 2.0 | 94.33 | Great | |
| Comparative 5 | Adipic acid dihydrazide | 2.0 | 81.18 | Great | |
| Comparative 6 | Hexamethylenediamine | 2.0 | 80.06 | Great | |
| Comparative 7 | Condensate polymer of nonamethylenediamine and urea. | 2.0 | 96.30 | 125 | 90 |

[1] Percentage of residue after heat-treating the composition at 222° C. in air for 60 minutes
[2] Amount of gas generated in terms of ml. per gram of the composition after heat-treating the same at 222° C. for 90 minutes in a syringe.
[3] Measured by using Hunter colormeter.

In a practical shaping, R and S referred to above are required to be more than 98% and less than 80 ml./g., respectively, and effect of thermal stabilizers incorporated is evaluated on these bases.

As is shown by the results, the use of copolyamide alone affords only an unsatisfactory result, and although the addition of diphenylamine together therewith manages to give a fair result, there still remains much to be desired with regard to the endurable stability, coloration and discoloration.

It can be noted that in the condensate of this invention the supplemental use of amines is not required.

The whiteness of a thin plate obtained according to this invention was measured in terms of Z value with a satisfactory result.

EXAMPLES 5–17

With a polyoxymethylenediacetate having an intrinsic viscosity of 2.10 were incorporated 1.5% by weight of condensates synthesized from adipic acid dihydrazide, urea and hexamethylenediamine according to the same procedures as described in Example 1 but in various proportions as specified in the following Table 2, and 0.5% by weight of 2,2'-methylenebis(4-methyl - 6 - tert-butylphenol).

After a thorough kneading, the resulting mixture was subjected to thermal stabilization tests with the results shown in Table 2.

TABLE 2

| Example Nos. | Reactant composition (g.) | | | R,* percent | Whiteness of 3 mm. thickness shaped plate* (Z value) |
|---|---|---|---|---|---|
| | Adipic acid dihydrazide | Hexamethyl-enediamine | Urea | | |
| 5 | 174 | 116 | 6 | 99.02 | 98 |
| 6 | 174 | 116 | 12 | 99.03 | 98 |
| 7 | 174 | 116 | 24 | 99.00 | 98 |
| 8 | 174 | 116 | 30 | 99.12 | 98 |
| 9 | 174 | 116 | 60 | 99.23 | 98 |
| 10 | 174 | 116 | 240 | 99.01 | 98 |
| 11 | 174 | 11.6 | 30 | 99.25 | 97 |
| 12 | 174 | 23.2 | 30 | 99.00 | 98 |
| 13 | 174 | 58.0 | 30 | 99.10 | 98 |
| 14 | 174 | 11.6 | 45 | 98.88 | 98 |
| 15 | 174 | 23.2 | 60 | 98.82 | 98 |
| 16 | 174 | 11.6 | 60 | 99.25 | 98 |
| 17 | 87 | 116 | 60 | 98.71 | 98 |

*Same as in Table 1.

EXAMPLE 18

To a 1000 cc. capacity hard-glass three-neck flask were charged 230 parts by weight of sebacic acid dihydrazide and heated at 200° C. with agitation under nitrogen stream to melt.

To the flask were added 30 parts by weight and 116 parts by weight of hexamethylenediamine and the reaction was carried out by heating at 190° C. for 300 minutes.

The molten fluid which was colorless and transparent gradually increased its viscosity and became turbid in the terminal stage of the reaction to give a viscous translucent molten fluid.

Then, the reaction system was made vacuum of 1 mm. Hg and the reaction temperature was raised to 200° C. and the reaction was further carried on for 300 minutes to complete the reaction. There were obtained 220 parts by weight of a white massive condensate having elementary analysis values of 53.71% carbon, 7.69% hydrogen and 24.55% nitrogen.

The resulting condensate was softened and molten at about 195° C. and the same was compression-moulded in a hot press to afford a colorless, transparent and beautiful film sheet.

The condensate obtained in the instant Example was soluble in dimethylsulfoxide or methanol and it was possible to obtain a film by evaporating the solvent from the solution and solidifying the residue. Furthermore, the condensate was able to be finely divided by pouring the same into a non-solvent such as dioxane. The condensate had a specific viscosity of 0.30 as measured in methanol at 30° C.

With a polyoxymethylenediacetate having an intrinsic viscosity of 2.10 were incorporated 1.5% by weight of the condensate obtained above, 0.5% by weight of 4,4'-butylidenebis(3 - methyl-6-tert-butylphenolformate) and 0.2% by weight of titanium white (Rutile type) and, after a thorough kneading, the resulting mixture was injection-moulded at 190° C. to give a thin plate having a thickness of 3 mm.

A cut piece of the thin plate was heated at 222° C. for 120 minutes in air and the whiteness (Z value) was 97, while that before heating had been 99, though there was a weight loss by 1.3%.

A series of operations in which the shaped plate was crushed and re-worked by injection was repeated four times, but, no important coloration was observed.

Example 19

There were condensation polymerized 258 parts by weight of tetradecane-dioic acid dihydrazide, 116 parts by weight of hexamethylenediamine and 50 parts by weight of urea in the same manner as described in Example 1 and there were obtained 290 parts by weight of a white massive condensate having a softening point of about 140° C.

With a polyoxymethylenediacetate having an intrinsic viscosity of 2.00 were incorporated 1.5% by weight of the condensate obtained above and 0.5% by weight of 4,4'-butylidenebis(3-methyl-6-tert-butylphenol) and, after a thorough kneading, the resulting mixture was injection-moulded to afford a thin plate having a thickness of 3 mm.

A cut piece of the thin plate thus obtained was heated at 222° C. for 120 minutes in air, but there was observed practically no coloration, though there was a weight loss by 1.8%.

A series of operations in which the shaped plate was crushed, then, 20% by weight thereof was mixed with fresh pellets and re-moulded by injection was repeated, but no important coloration nor discoloration was observed.

Examples 20–32

To a 300 cc. three-neck flask provided with a powerful agitator were charged urea, adipic acid dihydrazide and hexamethylenediamine in various proportions as specified in the following Table 3 and the mixture was molten by heating at 200° C. under nitrogen stream.

Then, the reaction temperature was lowered to 170° C. and the reaction was carried out at 170° C. for 300 minutes. The reaction mixture increased its viscosity as generating ammonia gas and turned to a viscous, colorless and translucent molten fluid.

The reaction system was then connected to a vacuum line of 1 mm. Hg and the reaction was further carried on by heating at 220° C. for 90 minutes to afford nitrogen-containing condensates having different compositions from each other.

With a polyoxymethylenediacetate having an intrinsic viscosity of 1.60 were incorporated each portion of 1.0% by weight of these nitrogen-containing condensates obtained above and 0.5% by weight of 2,2'-methylenebis(4-methyl-6-tert-butylphenol) and, after a thorough kneading, the resulting mixture was injection-moulded at 195° C. to afford a sample piece, respectively, of which thermal stability was tested with the results tabulated in Table 3.

TABLE 3

| Example Nos. | Reactant composition (g.) | | | R,* percent | Whiteness of shaped product* (Z value) |
|---|---|---|---|---|---|
| | Adipic acid dihydrazide | Urea | Hexamethyl-enediamine | | |
| 20 | 43 | 30 | 29 | 99.30 | 98 |
| 21 | 46 | 32 | 24 | 99.26 | 98 |
| 22 | 48 | 34 | 19 | 99.20 | 98 |
| 23 | 50 | 35 | 14 | 98.80 | 97 |
| 24 | 55 | 37 | 7 | 98.85 | 97 |
| 25 | 62 | 21 | 33 | 99.36 | 99 |
| 26 | 67 | 23 | 26 | 99.18 | 98 |
| 27 | 72 | 25 | 21 | 99.26 | 99 |
| 28 | 79 | 27 | 11 | 98.99 | 98 |
| 39 | 25 | 42 | 16 | 99.20 | 99 |
| 30 | 35 | 36 | 25 | 99.31 | 98 |
| 31 | 121 | 12 | 11 | 98.95 | 98 |
| 32 | 139 | 6 | 11 | 98.79 | 98 |

*Same as in Table 1.

170° C. at which the reaction was carried out for 5 hours with agitation.

The condensate at this initial stage of heating was divided into portions each of which was further condensed by heating under a reduced pressure of 1 mm. Hg and conditions as specified in the following Table 4, resectively, with results tabulated in the same table.

With a polyoxymethylenediacetate having an intrinsic viscosity of 2.10 were incorporated each portion of 0.8% by weight of the nitrogen-containing condensates shown in Table 4 and 0.3% by weight of 1,1,3-tris(2-methyl-4-formyloxy-5-tert-butylphenyl)butane and, after a thorough kneading, the resulting mixture was injection-moulded at 195° C. and pelletized, respectively. The results are also shown in Table 4.

TABLE 4

| Example Nos. | Condensation conditions | | Product condensate | | | R,* percent | Composition Whiteness* (Z value) |
|---|---|---|---|---|---|---|---|
| | Temp., °C. | Time, hrs. | Yield percent | Elementary analysis, N percent | Appearance | | |
| 34 | 190 | 1 | 65 | 25.18 | White, translucent | 98.30 | 97 |
| 35 | 190 | 3 | 63 | 25.72 | Colorless, transparent | 98.43 | 98 |
| 36 | 190 | 5 | 60 | 25.99 | do | 98.45 | 98 |
| 37 | 200 | 1 | 62 | 25.79 | White, translucent | 98.24 | 98 |
| 38 | 200 | 3 | 60 | 26.02 | Colorless, transparent | 99.00 | 99 |
| 39 | 200 | 5 | 59 | 26.50 | do | 98.93 | 99 |
| 40 | 220 | 0.5 | 65 | 25.20 | White, translucent | 98.64 | 98 |
| 41 | 220 | 1 | 63 | 25.98 | Colorless, transparent | 99.10 | 99 |
| 42 | 220 | 3 | 58 | 25.88 | do | 99.15 | 99 |
| 43 | 220 | 5 | 56 | 25.73 | do | 99.03 | 99 |
| 44 | 240 | 0.5 | 53 | 25.80 | do | 99.18 | 99 |
| 45 | 240 | 1 | 53 | 25.78 | do | 99.21 | 99 |
| 46 | 240 | 2 | 51 | 25.86 | do | 99.41 | 99 |

*Same as in Table 1.

Example 33

To a 1000 cc. capacity three-neck flask were charged 258 parts by weight of tetradecane-dioic acid dihydrazide, 276 parts by weight of 3,9-bis(3-aminopropyl)-2,4,8,10-tetraspiro[5.5]undecane and 60 parts by weight of urea and heated at 190° C. with agitation.

The reaction mixture gradually turned to a viscous molten fluid as generating ammonia gas.

Then, the reaction mixture was made vacuum of 1 mm. Hg and the reaction was carried out at 210° C. for 120 minutes. After the reaction was completed, there were obtained 360 parts by weight of an nitrogen-containing condensate of a white and translucent appearance.

With a polyoxymethylenediacetate having an intrinsic viscosity of 1.80 were incorporated 1% by weight of the condensate obtained above and 0.3% by weight of 1,1,3-tris(2 - methyl-4-hydroxy-5-tert-butylphenyl)butane and, after a thorough kneading, the resulting mixture was injection-moulded at 190° C. to afford a shaped article having a good whiteness and a thermal stability of 98.92.

Examples 34–46

To a 1000 cc. capacity three-neck flask were charged 174 parts by weight of adipic acid dihydrazide and heated at 200° C. with agitation under nitrogen stream to melt.

To the flask were subsequently added 60 parts by weight of urea and 116 parts by weight of hexamethyl-enediamine and the reaction temperature was lowered to 75

Example 47

To a hard-glass ampoule were charged 17.4 parts by weight of adipic acid dihydrazide, 11.6 parts by weight of hexamethylenediamine and 7.1 parts by weight of biuret and heated at 190° C. for 240 minutes under atmospheric pressure. The ampoule was then connected to a vacuum line of 1 mm. Hg and the condensation reaction was further carried on at 220° C. for 120 minutes to yield 22 parts by weight of a white nitrogen-containing condensate having elementary analysis values of 50.55% carbon, 7.20% hydrogen and 27.80% nitrogen.

With a polyoxymethylenediacetate having a softening point of 180–190° C. and an intrinsic viscosity of 2.10 were incorporated 0.8% by weight of the condensate obtained above and 0.4% by weight of 4,4'-butylidenebis (3-methyl-6-tert-butylphenol) and, after a thorough kneading, the resulting mixture was injection-moulded under conditions including a cylinder temperature of 195° C., a mould temperature of 100° C., and an injection pressure of 1000 kg./cm.$^2$ to afford a thin plate having a thickness of 3 mm.

A cut piece of the thin plate thus obtained was heated at 220° C. for 120 minutes in air and the whiteness (Z value) of the plate remained at 99, though there was a weight loss by 1.9%.

The whiteness (Z value) of a film obtained by shaping the composition heat-treated at 220° C. referred to above using a test hot press at 190° C. with a pressure of 200 kg./cm.$^2$ was 98.

Examples 48–58

Various types of dicarboxylic acid dihydrides, diamines and ureas or derivatives thereof as specified in the following Table 5 were reacted in the same recipe as given in Example 1 and there were synthesized various nitrogen-containing condensates.

With a polyoxymethylenediacetate having an intrinsic viscosity of 2.10 were incorporated each portion of 0.7% by weight of these nitrogen-containing condensates obtained above and 0.4% by weight of 1,1,3-tris(2-methyl-4 - hydroxy - 5 - tert - butylphenyl)butane and, after a thorough kneading, the resulting mixture was pelletized using a test extruder having a cylinder inner diameter of 20 mm. at a cylinder temperature of 190° C., respectively, and the thermal stability was measured with the results tabulated in Table 5.

TABLE 5

| Examples Nos. | Composition of charge (mol percent) | | | Yield, percent | Softening point (° C.) | Appearance | Resulting composition | |
|---|---|---|---|---|---|---|---|---|
| | Type of dicarboxylic acid hydrazide | Type of diamine | Type of urea | | | | R,* percent | Whiteness* (Z value) |
| 48 | Sebacic acid dihydrazide 25. | Bisaminopropyl ether 25. | Urea 50 | 62 | 100–130 | Colorless, transparent. | 99.08 | 99 |
| 49 | Suberic acid dihydrazide 30. | Hexamethylenediamine 20. | do | 64 | 140–160 | do | 99.21 | 99 |
| 50 | Oxadivaleric acid dihydrazide 40. | Pentanethylenediamine 20. | Urea 40 | 67 | 160–180 | do | 98.80 | 98 |
| 51 | Cylohexanedicarboxylic acid dihydrazide 35. | Hexamethylenediamine 20. | Urea 45 | 60 | 140–160 | Colorless, translucent. | 98.72 | 98 |
| 52 | Sebacic acid dihydrazide 30. | Hexamethylenediamine 25. | Ethyleneurea 45. | 62 | 170–180 | Colorless, transparent. | 99.03 | 99 |
| 53 | Adipic acid dihydrazide 25. | do | Biurea 50 | 59 | 180–190 | do | 99.00 | 98 |
| 54 | Sebacic acid dihydrazide 30. | Tetramethylenediamine 25. | Methylenebisurea 45. | 60 | 140–160 | do | 98.74 | 99 |
| 55 | Azeliac acid dihydride 40. | Hexamethylenediamine 20. | Urea 40 | 59 | 140–180 | do | 99.21 | 99 |
| 56 | Suberic acid dihydrazide 33. | Nonamethylenediamine 20. | Thiourea 47 | 62 | 160–190 | White, translucent. | 98.80 | 97 |
| 57 | Adipic acid dihydrazide 35. | do | Ethylene thiourea 45. | 58 | 180–200 | do | 98.72 | 97 |
| 58 | Dimeric acid dihydrazine 25. | Hexamethylenediamine 25. | Urea 50 | 60 | 70–120 | Pale yellow, transparent. | 98.20 | 97 |

*Same as in Table 1.

Example 59

To a hard-glass ampoule were charged 7.5 parts by weight of oxalic acid dihydrazide, 8.6 parts by weight of decamethylenediamine and 6 parts by weight of urea and the reaction was carried out by heating at 210° C. for 120 minutes under nitrogen stream.

The ampoule was then connected to a vacuum line of 1 mm. Hg and the reaction temperature was raised to 240° C. and further heated for 180 minutes.

The reactant which was white and massive at first started melting after the lapse of about 120 minutes from the starting of heating under a reduced pressure and turned to a very viscous matter of colorless and transparent appearance. Finally, there was obtained 13 parts by weight of a colorless and transparent nitrogen-containing condensate having an elementary analysis value of 21.08% nitrogen.

The condensate thus obtained afforded a beautiful film when shaped by means of a test hot press with a pressure of 250 kg./cm.²

With a polyoxymethylenediacetate having an intrinsic viscosity of 2.30 were incorporated 0.8% by weight of the resulting nitrogen-containing condensate and 0.3% by weight of 4,4'-butylidenebis(3-methyl-6-tert-butylphenol) and, after a thorough kneading, the resulting mixture was pelletized by using a test extruder having a cylinder inner diameter of 20 mm. at a cylinder temperature of 195° C.

A portion of the resulting polyacetal pellet was heated at 222° C. for 90 minutes in air with practically no coloration, though there was a weight loss by 1.2%.

The polyacetal pellet obtained above was repeatedly pelletized five times under the same cylinder conditions and, as a result, the whiteness remained unchanged during the repetition of four times, showing a Z value of 98, which turned to 97 in the fifth repetition.

Example 60

To a 300 cc. three-neck flask provided with a powerful agitator were charged 17 parts by weight of adipic acid dihydrazide, 16 parts by weight of malonic acid dihydrazide, 40 parts by weight of isophoronediamine and 80 parts by weight of biuret and the reactants were heated at 200° C. under nitrogen stream and molten, then, the reaction was further carried on for 300 minutes at the same temperature. The reaction mixture was solidified as generating a gas.

The reaction system was then connected to a vacuum line of 1 mm. Hg and the reaction was still further carried on at 230° C. for 120 minutes. The reaction mixture was gradually molten and turned to a very viscous, colorless and transparent molten fluid. As a result, there were obtained 93 parts by weight of a colorless, transparent and glass-like nitrogen-containing condensate having an elementary analysis value of 20.68% nitrogen. The resulting condensate had a softening point of 180° C.

With a polyoxymethylenedimethylether having an intrinsic viscosity of 2.10 were incorporated 0.9% by weight of the nitrogen-containing condensate obtained above and 0.4% by weight of 2,2'-methylenebis-(4-methyl-6-tert-butylphenol) and, after a thorough kneading, the resulting mixture was pelletized using a small-size test extruder having a cylinder inner diameter of 20 mm. at a cylinder temperature of 195° C.

As a result, there was obtained a pellet having a whiteness Z value of 99. A portion of this pellet was heated at 222° C. for 120 minutes in air, observing practically no discoloration, though there was a weight loss by 1.3%.

Examples 61–64

Each portion of 0.8% by weight of the condensate having elementary analysis values of 56.12% carbon, 8.66% hydrogen and 20.34% nitrogen, synthesized from adipic acid dihydrazide, urea and hexamethylenediamine in Example 1 described hereinbefore was incorporated into various copolyacetals as specified in the following Table 6, respectively, together with 0.3% by weight of 2,2'-methylenebis-(4-methyl-6-tert-butylphenol) and, after a thorough kneading, the resulting mixture was pelletized by extrusion at a cylinder temperature of 185° C.

The results of the test on the thermal stabilities of these pellets thus obtained are tabulated in Table 6.

From these examples, it will be understood that the thermal stabilizer of this invention is quite effective in improving the thermal stabilities of polyoxymethylene and copolyoxymethylene.

TABLE 6

| Examples Nos. | Description of copolyoxymethylene | Thermal stability R (percent) 60 min. | Thermal stability R (percent) 90 min. | Whiteness ≦(Z value) |
|---|---|---|---|---|
| 61 | Copolymer having an intrinsic viscosity of 2.10 and about 3% styrene content obtained by irradiating a mixture of trioxane and styrene with a γ-ray of cobalt 60 in an amount of $1.2 \times 10^6 \gamma$ at 0° C., post-effect polymerizing at 50° C. for 8 hrs., and acetylating the resulting copolymer with acetic anhydride. | 99.04 | 98.83 | 99 |
| 62 | Copolymer having an intrinsic viscosity of 1.80 obtained by irradiating a mixture of trioxane and acrylamide with a γ-ray of cobalt 60 in an amount of $1.2 \times 10^6 \gamma$ at 0° C. and posteffect polymerizing at 50° C. for 8 hrs. | 99.21 | 98.91 | 99 |
| 63 | Copolymer having an intrinsic viscosity of 1.80 and containing 2% idioxolane obtained by copolymerizing trioxane and dioxolane using borontrifluoride etherate at 66° C. for 4 hrs. and dissolving the resulting copolymer in benzylalcohol containing 10% tributylamine to remove instable components therefrom. | 99.00 | 98.82 | 99 |
| 64 | Copolymer having an intrinsic viscosity of 1.90 and containing 1.1 mole percent of dioxolane obtained by copolymerizing formaldehyde and dioxolane and dissolving the resulting copolymer in benzylalcohol containing 10% tributylamine at 145° C. to remove instable components therefrom. | 99.03 | 98.86 | 99 |

Example 65

To a stainless steel autoclave provided with an agitator were charged 200 parts by weight of adipic acid dimethylester, 275 parts by weight of hydrazine hydrate having a purity of 90%, 200 parts by weight of hexamethylenediamine and 600 parts by weight of urea and the reaction was carried out at 180° C. under autogenous pressure.

After completion of the reaction, the reaction system was cooled to 70° C. and, while charging nitrogen gas into the autoclave, the reaction temperature was raised gradually and, ultimately, the reaction was carried out at 200° C. for 120 minutes.

Then, pressure of the autoclave was reduced to 2 mm. Hg and the heating was further carried on at 210° C. for 240 minutes to complete the reaction. There were yielded 580 parts by weight of a colorless and transparent nitrogen-containing condensate having an elementary analysis value of 25.36% nitrogen.

The resulting condensate was shaped by a test hot press into a film at 170° C. with a pressure of 250 kg./cm.[2]

Examples 66–70

To a hard-glass ampoule were charged various dicarboxylic acid dihydrazides, diamines and ureas or derivatives thereof, respectively, and heated at 180° C. under nitrogen stream and molten. The reaction was further carried on at the same temperature, i.e. 180° C., for 90 minutes. The ampoule was then connected to a vacuum line of 1 mm. Hg and the reaction was still further carried on at 180° C. for 180 minutes to remove unreacted and volatile matters therefrom.

With a polyoxymethylenediacetate were incorporated 0.8% by weight of the resulting nitrogen-containing condensate and 0.4% by weight of 1,1,3-tris(2-methyl-4-hydroxy-5-tert-butylphenyl)butane and, after a thorough kneading, the resulting mixture was pelletized by means of a small-size test extruder having a cylinder inner diameter of 20 mm. at a cylinder temperature of 195° C., respectively.

The thermal stabilities of the resulting pellets were tested with the results tabulated in the following Table 7.

TABLE 7

| Examples Nos. | Charge composition (mol percent) Dicarboxylic acid hydrazide | Charge composition (mol percent) Diamine | Charge composition (mol percent) Urea | Yield, percent | Softening point, ° C. | Appearance | Resulting composition R,* percent | Resulting composition Whiteness* (Z value) |
|---|---|---|---|---|---|---|---|---|
| 66 | Terephthalic acid dihydrazide 30. | Hexamethylene-diamine 20. | Urea 50 | 58 | 180–190 | Colorless, transparent. | 98.70 | 98 |
| 67 | Naphthalene dicarboxylic dihydrazide 25. | Ethylene-diamine 20 | Biurea 55 | 48 | 190–200 | do | 98.58 | 98 |
| 68 | Decamethylenedicarboxylic acid dihydrazide 33. | Isophoronediamine 33. | Urea 34 | 50 | 120–140 | do | 99.25 | 99 |
| 69 | Octadecane-1,18-dicarboxylic acid dihydrazide 40. | Polyethylene-imine** 20. | Urea 40 | 62 | 70–90 | Pale yellow, translucent. | 98.11 | 98 |
| 70 | Eicosane-1,20-dicarboxylic acid dihydrazide 45. | Hexamethylene-diamine 15. | do | 60 | 40–85 | Colorless, transparent. | 98.49 | 99 |
| 71 | Sebacic acid dihydrazide 30. | Hexamethylene-diamine 20. | Ethylene-urea 25; thiourea 25. | 61 | 110–135 | Pale yellow, translucent. | 98.02 | 98 |

*Same as in Table 1.  **Molecular weight=600.

With a polyoxymethylenediacetate having an intrinsic viscosity of 1.80 were incorporated 1.0% by weight of the resulting nitrogen-containing condensate and 0.3% by weight of 1,1,3-tris(2-methyl-4-formyloxy-5-tert-butylphenyl)butane and, after a thorough kneading, the resulting mixture was injection-moulded at 195° C. with a pressure of 800 kg./cm.[2] to afford a shaped article having good whiteness and surface appearance. The thermal stability of the resulting shaped article was 98.86.

We claim:
1. Polyoxymethylene compositions containing 0.1 to 10% by weight based on polyacetal of a nitrogen-containing condensate obtained by polymerizing (A) at least a member selected from the group consisting of a dicarboxylic acid dihydrazide having 2–20 carbon atoms and a substance capable of affording a dicarboxylic acid dihydrazide (B) at least a member selected from the group consisting of a diamine having 2–20 carbon atoms and a main chain consisting of hydrocarbon groups and optionally containing oxygen and polyamine, and (C) at least a member selected from the group consisting of a urea, urea derivative, thiourea and thiourea derivative, by heating at a temperature ranging from 50° C. to 300° C. for 1-20 hours in air or an inert gas, the proportion of said reactants A:B:C being 1:0.1-5:0.1-10 in molar ratio.

2. Polyoxymethylene compositions according to claim 1 wherein said nitrogen-containing condensate being obtained by heating (A) a member selected from the group consisting of a dicarboxylic acid dihydrazide having 2-20 carbon atoms and a substance capable of affording a dicarboxylic acid dihydrazide, (B) at least a member selected from the group consisting of a diamine having 2-20 carbon atoms and a main chain consisting of hydrocarbon groups and optionally containing oxygen and polyamine, and (C) at least a member selected from the group consisting of a urea, ethyleneurea, biuret, methylenebisurea, thiourea and ethylenethiourea at a temperature ranging from 50° C. to 300° C. for 1-20 hours in air or an inert gas, and further heating at a temperature ranging from 150° C. to 300° C. for 1-10 hours under a reduced pressure, the proportion of said reactants A:B:C being 1:0.5-5:0.1-10 in molar ratio.

3. Polyoxymethylene compositions containing (a) at least 90% by weight of a member selected from the group consisting of a high molecular weight polyoxymethylenediacetate, polyoxymethylenediether and copolyoxymethylene, (b) 0.1-10% by weight of the nitrogen-containing condensate defined in the preceding claims 1 or 2, (c) 0.01-5% by weight of an antioxidant selected from the group consisting of aromatic amines, alkyl-substituted phenols, cresol, alkyl-substituted hydroquinones, alkylidenebis-alkyl-substituted phenols and alkyl-substituted phenolformates, and (c) 0.01-5% by weight of a light stabilizer of a member selected from the group consisting of benzophenone and benzotriazols.

4. Polyoxymethylene compositions according to claim 1 wherein said polyacetal is a high molecular weight polyoxymethylene.

References Cited

UNITED STATES PATENTS 3,448,169    6/1969    Wagner    260—858

FOREIGN PATENTS 913,162    12/1962    Great Britain    260—858

PAUL LIEBERMAN, Primary Examiner

U.S. Cl. X.R.

260—37, 45.7, 45.9, 45.95, 858

PO-1050
(5/69)

UNITED STATES PATENT OFFICE
CERTIFICATE OF CORRECTION

Patent No. 3,574,786          Dated    April 13, 1971

Inventor(s) SHINICHI ISHIDA et al

It is certified that error appears in the above-identified patent and that said Letters Patent are hereby corrected as shown below:

Column 1, line 8 - delete "Asaka" and replace with "Osak

*Column 2, line 11 - insert "a" after "manifesting";

*        line 32 - rewrite "defected" as "defective";

*        line 48 - rewrite "these" as "those".

Column 3, line 59 - rewrite "or" , second occurrence, sh read -- for --.

*        lines 64 and 65 - delete "is proceeded" and replace with "proceeds".

Column 4, line 31 - after "CONHNHCO" insert a semi-colon (as indicated in spec. at page 9, lin

*        line 49 - rewrite "feature" as "features".

*Column 5, line 7 - rewrite "forms" as "form";

*        line 21 - delete "by";

*        line 22 - delete "a";

*        line 28 - rewrite "afford" as "affords".

PO-1050
(5/69)

UNITED STATES PATENT OFFICE
CERTIFICATE OF CORRECTION

Patent No. 3,574,786     Dated April 13, 1971

Inventor(s) SHINICHI ISHIDA et al

It is certified that error appears in the above-identified patent and that said Letters Patent are hereby corrected as shown below:

*Column 6, line 23 - delete "its" and replace with "in";

*     line 24 - delete "as generating ammonia gas";

*     line 25 - after period (.) insert "Ammonia gas evolved from the reaction mixture.".

*Column 7, line 6 - after "only" delete "an";

line 6 - rewrite "result" as "results" (as ind ted in spec. at page 15, line 6);

*     line 69 - delete "made" and replace with "maint: under a".

Column 9, Table 3 - under "Example Nos." rewrite "39" as under "R, percent" rewrite "98.79 as "98.97" (as indicated in spec. at pag lines 14 and 17);

*     line 54 - delete "generating" and after "gas" i "was generated";

PO-1050
(5/69)

UNITED STATES PATENT OFFICE
CERTIFICATE OF CORRECTION

Patent No. 3,574,786     Dated April 13, 1971

Inventor(s) SHINICHI ISHIDA et al     PAGE - 3

It is certified that error appears in the above-identified patent and that said Letters Patent are hereby corrected as shown below:

\*Column 9, line 55 - delete "made" and replace with "maintained under a";

line 58 - rewrite "an" as "a" (as indicated in spec. at page 21, line 1).

\*Column 12, line 12 - before "a" delete "generating" and after "gas" insert "was generated".

Columns 13 and 14, Table 6 - delete "$\gtreqless$" from the sub-he "Whiteness (Z value)";

referring to Example No. 63, under the heading "Description of Copolyoxymethyl in line 2 rewrit "idioxolane" as "diox (all as indicated in spec. at page 29)

Column 14, line 69 - "polyacetal" should be deleted and re placed with "polyoxymethylene" (as in cated in Examiner's Amendment of May 1970).

Signed and sealed this 27th day of June 1972.

(SEAL)
Attest:

EDWARD M. FLETCHER, JR.      ROBERT GOTTSCHALK